United States Patent
Sasahara et al.

(10) Patent No.: US 8,401,251 B2
(45) Date of Patent: Mar. 19, 2013

(54) FACE POSE ESTIMATION DEVICE, FACE POSE ESTIMATION METHOD AND FACE POSE ESTIMATION PROGRAM

(75) Inventors: Hideaki Sasahara, Tokyo (JP); Yoshihiro Noguchi, Tokyo (JP); Keiji Shimada, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 306 days.

(21) Appl. No.: 12/863,132

(22) PCT Filed: Jan. 16, 2009

(86) PCT No.: PCT/JP2009/050543
§ 371 (c)(1),
(2), (4) Date: Jul. 15, 2010

(87) PCT Pub. No.: WO2009/091029
PCT Pub. Date: Jul. 23, 2009

(65) Prior Publication Data
US 2011/0052013 A1 Mar. 3, 2011

(30) Foreign Application Priority Data
Jan. 16, 2008 (JP) ................................. 2008-007270

(51) Int. Cl.
*G06K 9/00* (2006.01)
*G06K 9/34* (2006.01)
(52) U.S. Cl. ...................................................... 382/118
(58) Field of Classification Search .................. 382/103, 382/118, 159, 170, 181, 190, 216; 345/419, 345/423, 426, 427
See application file for complete search history.

(56) References Cited

U.S. PATENT DOCUMENTS

| | | | |
|---|---|---|---|
| 6,944,319 B1 * | 9/2005 | Huang et al. | 382/118 |
| 7,519,200 B2 * | 4/2009 | Gokturk et al. | 382/118 |
| 7,742,623 B1 * | 6/2010 | Moon et al. | 382/103 |
| 7,755,619 B2 * | 7/2010 | Wang et al. | 345/419 |

(Continued)

FOREIGN PATENT DOCUMENTS

| | | |
|---|---|---|
| JP | 2006-227739 A | 8/2006 |
| WO | WO 02/07095 A1 | 1/2002 |

OTHER PUBLICATIONS

Translation of previously submitted International Preliminary Report on Patentability (PCT/IB/338, PCT/IB/373 and PCT/ISA/237), issued Aug. 10, 2010.

(Continued)

*Primary Examiner* — Amir Alavi
(74) *Attorney, Agent, or Firm* — Birch, Stewart, Kolasch & Birch, LLP

(57) ABSTRACT

An object is to provide a face pose estimating device, a face pose estimating method, and a face pose estimating program that allow high accuracy estimation of a face pose even if a face organ cannot be detected from an image. A face organ detector 11 of the face pose estimating device 10 detects a face organ from an image frame. A face pose candidate set generator 16 generates a face pose candidate set. A first similarity estimator 12 computes 3D-model-based similarities. A second similarity estimator 13 computes appearance-based similarities. A first likelihood estimator 141 computes a first likelihood corresponding to the 3D-model-based similarity. A second likelihood estimator 142 computes a second likelihood corresponding to the appearance-based similarities. An integrated likelihood estimator 143 computes an integrated likelihood by using the first and second likelihoods. A face pose estimator 15 estimates the face pose by using the integrated likelihood.

12 Claims, 15 Drawing Sheets

U.S. PATENT DOCUMENTS

2007/0041644 A1* 2/2007 Kim et al. .................. 382/190
2009/0060290 A1* 3/2009 Sabe et al. .................. 382/118
2011/0052013 A1* 3/2011 Sasahara et al. ............ 382/118

OTHER PUBLICATIONS

Office Action issued Jan. 5, 2011, in Japanese Patent Application No. 2009-550, 056 with English translation.

European Office Action, dated May 16, 2011, for European Application No. 09702586.0.

Krahnstoever et al., "Appearance Management and Cue Fusion for 3D Model-Based Tracking", Proceedings of the 2003 IEEE Computer Society Conference on Computer Vision and Pattern Recoginition (CVPR'03), XP010644680, Jun. 18-20, 2003.

Liao et al., "Integrating Multiple Visual Cues for Robust Real-Time 3D Face Tracking", AMFG 2007, LNCS 4778, pp. 109-123, XP019081573, 2007.

Murphy-Chutorian et al., "Head Pose Estimation in Computer Vision: A Survey", IEEE Transactions on Pattern Analysis and Machine Intelligence, vol. 31, No. 4, pp. 607-626, XP011266518, Apr. 2009 (Published online Apr. 16, 2008).

Supplementary European Search Report, dated May 4, 2011, for European Application No. 09702586.0.

International Search Report, PCT/ISA/210, Mar. 3, 2009, PCT/JP2009/050543.

* cited by examiner

F I G. 3
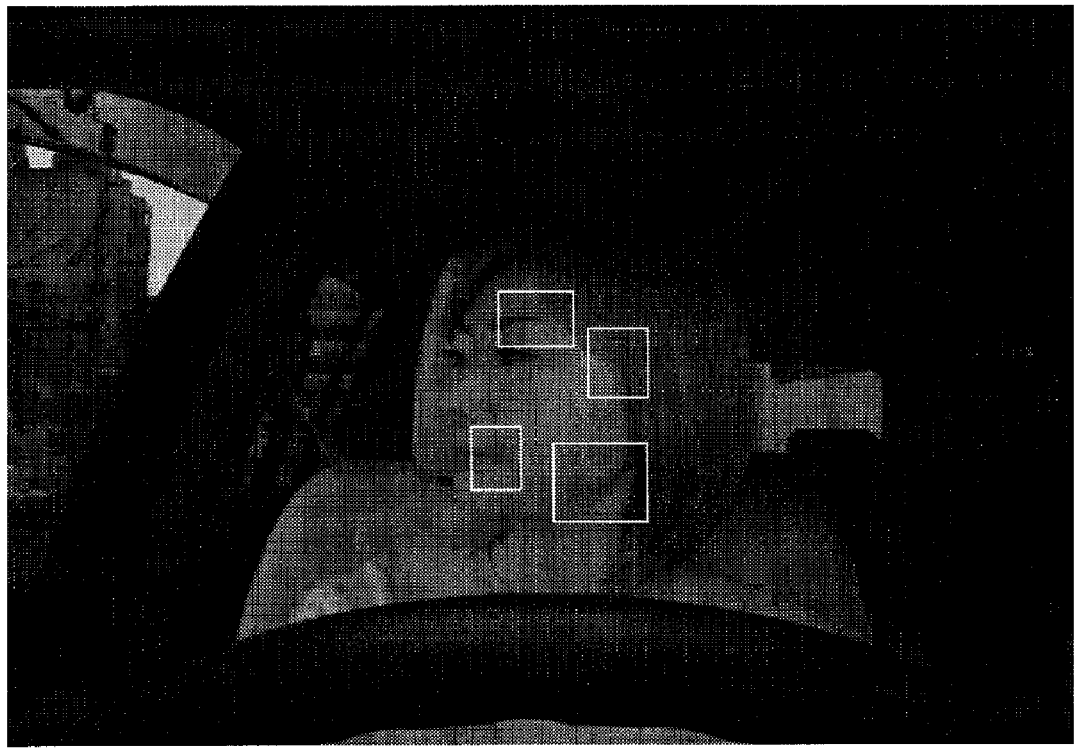

F I G. 4

FACE POSE ESTIMATION DEVICE, FACE POSE ESTIMATION METHOD AND FACE POSE ESTIMATION PROGRAM

This application is a 371 of PCT/JP2009/050543 filed on Jan. 16, 2009.

TECHNICAL FIELD

The present invention relates to a face pose estimation device, a face pose estimation method and a face pose estimation program that estimate a face pose by using an image where a face has been captured.

BACKGROUND ART

A technique for estimating a face orientation or a face pose can be applied to various fields. Here, the "face orientation" is represented with information indicating three orientations, or the yaw, pitch and roll.

The "face pose" at least represents the face orientation. Note that the "face pose" may include a notion of a position in a three-dimensional space, in addition to the face orientation. Accordingly, the "face pose" is represented, at the maximum, with six-dimensional information including the yaw, pitch, roll, x coordinate, y coordinate and z coordinate. The technique for estimating the face orientation or the face pose is regarded as useful, particularly in a field of safe driving support for a vehicle driver.

A three-dimensional face shape model based (hereinafter, referred to as "3D-model-based") method, an appearance-based method and a face-features-based method are known as representative methods used for face orientation estimation and face pose estimation by a computer vision (e.g., Yoichi SATO: "Computer Vision Techniques for Tracking Human Faces", The Journal of The Institute of Image Information and Television Engineers, Vol. 60, No. 4, pp. 516-519 (2006)). Each method will hereinafter be described.

A case of applying a 3D-model-based method to a face pose estimation will be described. Here, a method exploiting a particle filter, which is one of the time-series filters, is exemplified. The particle filter is an approximation computation method of the Bayesian filter, and represents a probability density function by using finite particles. The particle filter expresses a tracking target as a discrete probability density function by using a lot of hypotheses having state quantities and likelihoods, and propagates this probability density function by a state transition model. The "state" in the face pose means a state relating to face pose information such as a face position and face orientation. In a process of estimating the face pose, a lot of hypotheses on states of face pose are generated, similarities between an inputted face image and each of the hypotheses are computed, and a set of the hypotheses is updated based on the similarities. Then the face pose which corresponds to the state quantity of the hypothesis having the highest similarity is outputted, as an estimation result.

An appearance-based method has preliminary prepared face images with various face orientations. When a new face image is inputted, the method estimates which prepared face image is most similar to the inputted face image. Square sums of differences between corresponding pixel values are used for computing the similarity between images.

A face-features-based method determines face features on the basis of relative position relationships between the eyes and mouth in an input image, and estimates the face orientation. In examples of the face-features-based method, or JP2005-196567A (hereinafter, referred to as "Document 1") and JP11-281661A (hereinafter, referred to as "Document 2"), an image in which driver's face is captured is analyzed and the face orientation is estimated.

DISCLOSURE OF THE INVENTION

Problems to be Solved by the Invention

However, the techniques described in Documents 1 and 2 estimate the face orientation by using predetermined face organs such as eyes, nose and mouth, and it is impossible to estimate the face pose if the face organ is occluded by change of the face orientation or wearing of glasses or sunglasses. Accordingly, an estimatable angular range is limited within about 60 degrees in the lateral orientation. Limitation of the estimatable angular range causes a problem that a safe driving support for a driver is insufficient.

When the face orientation estimation or the face pose estimation is performed by the 3D-model-based method, the positions of predetermined face organs such as the eyes, nose and mouth in the input camera image are used. Accordingly, this causes a problem that it is impossible to estimate the face pose if a part of the face organs is occluded in the image, for instance, when the face is turned considerably aside. Further, in general, a three-dimensional face shape model used for the 3D-model-based method is a rigid body. Accordingly, this also causes the following problem. If a face skin is stretched when facial expression changes or face pose displacement occurs or the like, the face organ position changes. As a result, the inputted face image does not fit enough for the three-dimensional face shape model and it is impossible to estimate face pose with high accuracy.

The present invention is made in view of the above problems. It is an object of the present invention to provide a face pose estimation device, a face pose estimation method and a face pose estimation program that are highly accurate and, even when a face organ cannot be detected from an image, are capable of estimating a face pose.

Further, it is another object of the present invention to allow estimation of the face pose in a range where eyes, nose and mouth are occluded, without putting constraint on a user and without forcing the users to wear gear. Moreover, it is still another object of the present invention to allow estimation of the face pose even when the predetermined face organ is occluded because of wearing of glasses and variation in hairstyle.

Means for Solving the Problems

The present invention provides a face pose estimation device estimating a face pose representing at least an orientation of a face from a face image in which the face is captured in a time series manner, the device comprising: a face organ detector that detects a face organ from the face image; a face pose candidate set generator that generates a face pose candidate set, which is a set of face pose candidates to be estimated; a first similarity estimator that computes a first similarity according to a first parameter corresponding to respective positions of each face organ of each element of the face pose candidate set generated by the face pose candidate set generator and an actual face organ detected by the face organ detector; a second similarity estimator that computes a second similarity according to a second parameter corresponding to a pixel value according to displacements of each face image of the face pose candidate set generated by the face pose candidate set generator and an actual face image detected as a detection target by the face organ detector with respect to each predetermined reference pose; a first likelihood estimator that computes a first likelihood corresponding to the first similarity computed by the first similarity estimator; a second likelihood estimator that computes a second likelihood corresponding to the second similarity computed by the second similarity estimator; an integrated likelihood estimator that computes an integrated likelihood representing a degree of appropriateness of each element of the face pose candidate set by using the first and second likelihoods; and a face pose estimator that estimates the face pose by using the integrated likelihood computed by the integrated likelihood estimator, the integrated likelihood being considered by the face pose candidate set generator for generating a face pose candidate set in the next time step.

According to an aspect of the present invention, the face pose estimation device computes the integrated likelihood by using the first likelihood corresponding to the first similarity according to the first parameter and the second likelihood corresponding to the second similarity according to the second parameter, and estimates the face pose by using the computed integrated likelihood. Accordingly, this allows the face pose to be estimated more precisely than estimation of the face pose by using the first and second likelihoods separately.

In a preferred embodiment, the integrated likelihood estimator computes the integrated likelihood by using only either the first likelihood or the second likelihood in the case that the other likelihood is not available.

According to an aspect of the present invention, when any one of the first and second likelihoods is not computed, the integrated likelihood estimator computes the integrated likelihood by using only the other computed likelihood. Accordingly, this enables the face pose to be estimated even when the face organ cannot be detected.

In a preferred embodiment, the first and the second similarity estimators have a complementary relationship complementing respective performance characteristics of each other.

According to an aspect of the present invention, the first and the second similarity estimator are in the complementary relationship, and can complement each other. Accordingly, this allows the face pose to be highly accurately estimated.

In a preferred embodiment, the integrated likelihood estimator multiplies the first and second likelihoods by each other.

According to an aspect of the present invention, the integrated likelihood is computed by multiplying the first and second likelihoods by each other. Accordingly, this allows computation of the highly accurate integrated likelihood for estimating the face pose.

In a preferred embodiment, the first similarity estimator adopts a three-dimensional face shape model based similarity, the first parameter is an error in position, the second similarity estimator adopts a projective transformation appearance based similarity, and the second parameter is an error in pixel value.

In a preferred embodiment, the face pose estimator estimates the face pose on the basis of the face pose candidate having the highest integrated likelihood computed by the integrated likelihood estimator.

According to an aspect of the present invention, the face pose estimator estimates the face pose on the basis of the face pose candidate having the highest integrated likelihood computed by the integrated likelihood estimator, which enables the face pose to be estimated with high accuracy.

In a preferred embodiment, the face pose estimator estimates the face pose on the basis of any one of an average value, a median value and a barycenter, which is an average value weighted by the integrated likelihood, of numerical values based on at least a part of the face pose candidate set generated by the face pose candidate set generator.

According to an aspect of the present invention, the face pose estimator estimates the face pose on the basis of any one of the average value, the median value and the barycenter of the numerical values based on at least a part of the face pose candidate set. Accordingly, the estimation accuracy is degraded in comparison with a case of adopting the face pose candidate having the highest integrated likelihood as the face pose. However, the estimation accuracy is not significantly degraded.

In a preferred embodiment, the face pose estimator estimates the face pose on the basis of the face pose candidate corresponding to the highest integrated likelihood in the case that the highest integrated likelihood computed by the integrated likelihood estimator exceeds a predetermined threshold, and, the face pose estimator estimates the face pose on the basis of any one of an average value, a median value and a barycenter, which is an average value weighted by the integrated likelihood, of numerical values based on at least a part of the face pose candidate set generated by the face pose candidate set generator in the case that the highest integrated likelihood is equal to or less than the predetermined threshold.

The present invention can estimate the face pose by using the average value, the median value and the like, even when the highest likelihood is equal to or less than the predetermined threshold due to an error in detection of the face organ or the like. Accordingly, this allows the face pose to be highly accurately estimated.

In a preferred embodiment, the face pose candidate set generator generates the face pose candidate set used for computing the first and second similarities in the next time step on the basis of the face pose candidate set corresponding to a relatively higher integrated likelihood computed by the integrated likelihood estimator.

The present invention enables the face pose candidate set relatively similar to the actual face pose to be generated.

In a preferred embodiment, the face image is an image in which a driver's face of a vehicle has been captured.

According to an aspect of the present invention, the face pose estimation device can estimate the face pose of the driver. Accordingly, this allows the face pose estimation device to be used for the safe driving support for the driver.

Further, the present invention provides a vehicle comprising the above-described face pose estimation device.

The present invention allows the face orientation of the driver to be estimated in the vehicle, and enables the face pose estimating device to be used for the safe driving support in the vehicle.

Further, the present invention provides a face pose estimation method estimating a face pose representing at least an orientation of a face from a face image in which the face is captured in a time series manner, the method comprising: a face organ detecting step for detecting a face organ from the face image; a face pose candidate set generating step of generating a face pose candidate set, which is a set of face pose candidates to be estimated; a first similarity computing step of computing a first similarity according to a first parameter corresponding to respective positions of each face organ of each element of the face pose candidate set generated in the face pose candidate set generating step and an actual face organ detected by the face organ detecting step; a second similarity computing step of computing a second similarity according to a second parameter corresponding to a pixel value according to displacements of each face image of the face pose candidate set generated in the face pose candidate set generating step and an actual face image detected as a detection target in the face organ detecting step with respect to each predetermined reference pose; a first likelihood computing step of computing a first likelihood corresponding to the first similarity computed in the first similarity computing step; a second likelihood computing step of computing a second likelihood corresponding to the second similarity computed in the second similarity computing step; an integrated likelihood computing step of computing an integrated likelihood representing a degree of appropriateness of each element of the face pose candidate set by using the first and second likelihoods; and a face pose estimating step of estimating the face pose by using the integrated likelihood computed in the integrated likelihood computing step.

Moreover, the present invention provides a face pose estimation program causing a computer to perform: a face organ detecting step for detecting face organ from a face image in which the face is captured in a time series manner; a face pose candidate set generating step of generating a face pose candidate set, which is a set of face pose candidates to be estimated; a first similarity computing step of computing a first similarity according to a first parameter corresponding to respective positions of each face organ of each element of the face pose candidate set generated in the face pose candidate set generating step and an actual face organ detected by the face organ detecting step; a second similarity computing step of computing a second similarity according to a second parameter corresponding to a pixel value according to displacements of each face image of the face pose candidate set generated in the face pose candidate set generating step and an actual face image detected as a detection target in the face organ detecting step with respect to each predetermined reference pose; a first likelihood computing step of computing a first likelihood corresponding to the first similarity computed in the first similarity computing step; a second likelihood computing step of computing a second likelihood corresponding to the second similarity computed in the second similarity computing step; an integrated likelihood computing step of computing an integrated likelihood representing a degree of appropriateness of each element of the face pose candidate set by using the first and second likelihoods; and a face pose estimating step of estimating the face pose by using the integrated likelihood computed in the integrated likelihood computing step.

Advantages of the Invention

According to an aspect of the present invention, the face pose estimation device computes the integrated likelihood by using the first likelihood corresponding to the first similarity according to the first parameter and the second likelihood corresponding to the second similarity according to the second parameter, and estimates the face pose by using the computed integrated likelihood. Accordingly, this allows the face pose to be estimated more precisely than estimation of the face pose by using the first and second likelihoods separately.

BRIEF DESCRIPTION OF THE DRAWINGS

FIG. 3 shows an example of specifying a feature point search area according to the embodiment;

FIG. 4 is a diagram showing an example of edge extraction of a luminance image in the feature point search area according to the embodiment;

Figure 1:
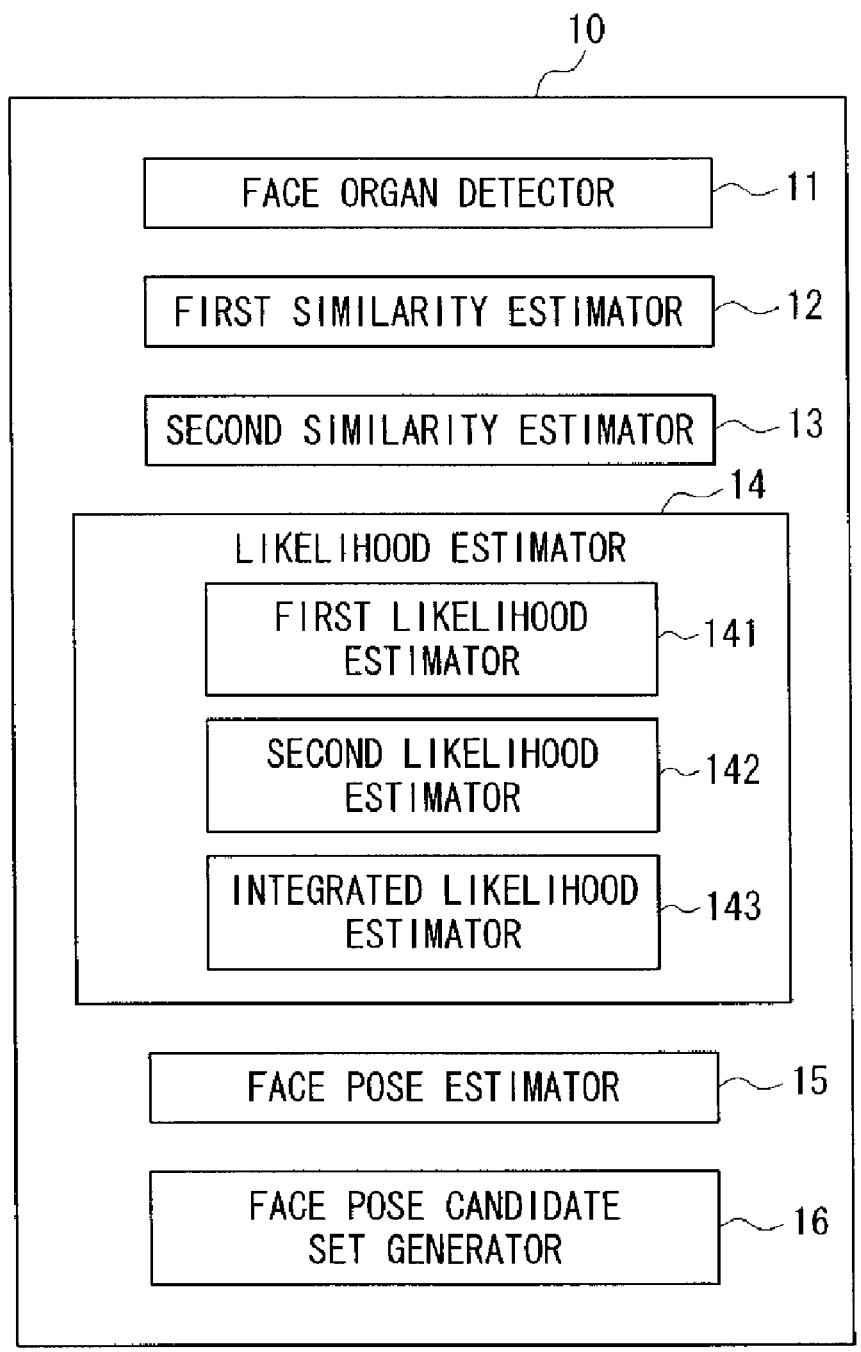
FIG. 1 is a block diagram showing a functional configuration of a face pose estimation device according to an embodiment of the present invention.

DESCRIPTION OF SYMBOLS 10 face pose estimation device
11 face organ detector
12 first similarity estimator
13 second similarity estimator
14 likelihood estimator
141 first likelihood estimator
142 second likelihood estimator
143 integrated likelihood estimator
15 face pose estimator
16 face pose candidate set generator

BEST MODE FOR CARRYING OUT THE INVENTION

An embodiment of the present invention will hereinafter be described with reference to the drawings. Note that, in each diagram to be referred to in the following description, substantially identical parts to those in the other diagrams are denoted by the identical symbols.

(Configuration of Face Pose Estimation Device)

FIG. 1 is a block diagram showing a functional configuration of a face pose estimation device 10 according to an embodiment of the present invention. As shown in the figure, the face pose estimation device 10 includes a face organ detector 11, a first similarity estimator 12, a second similarity estimator 13, a likelihood estimator 14 and a face pose estimator 15. A CPU (Central Processing Unit), which is not shown, of the face pose estimation device 10 performs a program stored in a storage device such as a ROM (Read Only Memory) and a hard disk, and thereby realizes the functional configuration in the face pose estimation device 10. Further, the face pose estimation device 10 includes an input interface, which is not shown, for receiving an image frame captured by a camera.

The face organ detector 11 detects a face organ from the image frame in which a face has been captured.

The first similarity estimator 12 computes a similarity by using the 3D-model-based estimating method. The details of this method are described in Kenji OKA, Yoichi SATO, Yasuto NAKANISHI, and Hideki KOIKE: "Head Pose Estimation System Based on Particle Filtering with Adaptive Diffusion Control", The transactions of the Institute of Electronics, Information and Communication Engineers. D-II, J88-D-II, 8, pp. 1601-1613 (2005). More specifically, the first similarity estimator 12 generates a set of hypotheses (hereinafter, referred to as "face pose candidate set"), which is a collection of a lot of (N: N is a natural number) discrete hypotheses (hereinafter, referred to as "face pose candidates") representing probability density functions of state quantities relating to face pose information. Next, a three-dimensional face shape model is three-dimensionally translated and rotated on the basis of face pose candidates constituting the face pose candidate set, and each feature point of the face organ on the three-dimensional face shape model is projected on the plane of the image frame (hereinafter, each feature point projected on the plane of the image frame is also referred to as "face organ coordinate candidate"). The error between the face organ detected by the face organ detector 11 and the corresponding position where the feature point of the face organ has been projected (corresponding to a "first similarity"; hereinafter, also referred to as "3D-model-based similarity") is then computed. The computation of the error for each face pose candidate is performed on every one of face pose candidates constituting the face pose candidate set, and the N similarities are determined.

The second similarity estimator 13 computes a similarity by using an appearance-based estimation method (projective transformation appearance basis) exploiting a projective transformation appearance of the face image. More specifically, firstly, the second similarity estimator 13 refers to face pose information such as face positions and face orientations corresponding to the respective N face pose candidates constituting the face pose candidate set. Next, a displacement of the face pose information with respect to a predetermined reference position is determined. The predetermined reference position is the face pose information estimated from a preceding image to an image used to detect the face organ. A projective transformation is applied to the image based on the determined N displacements. N images applied the projective transformation (hereinafter, referred to as "projectively transformed images") are images where the face pose information of each of the face pose candidates has been reflected on the previous image, which is the reference position. The second similarity estimator 13 computes the error in luminance between corresponding feature points of each of the N projectively transformed images and the input image (corresponding to a "second similarity"; hereinafter, also referred to as an "appearance-based similarity"). The error is not limited to that in luminance. Instead, the error of pixel values including a notion of luminance may be adopted. A subset of projective transformation, for instance, an affine transformation, may be adopted as a method of the projective transformation.

The likelihood estimator 14 includes a first likelihood estimator 141, a second likelihood estimator 142 and an integrated likelihood estimator 143.

The first likelihood estimator 141 computes a likelihood (corresponding to the "first likelihood") corresponding to the 3D-model-based similarity on the basis of the 3D-model-based similarity computed by the first similarity estimator 12. This likelihood is a value representing a degree of appropriateness of the face pose candidate in the 3D-model-based method. An example of a specific equation for the computation will be described later.

The second likelihood estimator 142 computes a likelihood (corresponding to the "second likelihood") corresponding to the appearance-based similarity on the basis of the appearance-based similarity computed by the second similarity estimator 13. This likelihood is a value representing a degree of appropriateness of the face pose candidate in the appearance-based method. An example of a specific equation for the computation will be described later.

The integrated likelihood estimator 143 computes the integrated likelihood representing the degree of appropriateness of each face pose candidate constituting the face pose candidate set by using both the likelihood computed by the first likelihood estimator 141 and the likelihood computed by the second likelihood estimator 142. When the face organ cannot be detected due to the occlusion of the face organ or the like, the 3D-model-based similarity cannot be computed. Accordingly, the integrated likelihood estimator 143 computes the integrated likelihood by using only the appearance-based similarity, thereby enabling the face pose to be estimated. When the appearance-based similarity cannot be computed for some reason, the integrated likelihood is computed by using only the 3D-model-based similarity, thereby enabling the face pose to be estimated.

An example of a specific method of computing the integrated likelihood by using both likelihoods is that the integrated likelihood estimator 143 multiplies the likelihood computed by the first likelihood estimator 141 by the likelihood computed by the second likelihood estimator 142 for the same face pose candidate, thereby computing the integrated likelihood for the face pose candidate. The mutual multiplication of the likelihoods as described above can regard the 3D-model-based likelihood and the appearance-based likelihood, which are independent from each other, as concurrent likelihoods. It is considered that the use of concurrent likelihoods realizes performance characteristics complementing each of performance characteristics (which will be described later) possessed by the 3D model basis and the appearance basis, as described above. Note that the method of computing the integrated likelihood is not limited to the multiplication.

The face pose estimator 15 estimates the face pose by using the integrated likelihood computed by the integrated likelihood estimator 143. More specifically, the face pose estimator 15 estimates the face pose on the basis of the face pose information corresponding to the face pose candidate having the highest integrated likelihood. Alternatively, any one of the average value, the median value and the average value (barycenter) weighted by the integrated likelihood of various numerical values included in the face pose information corresponding to all or a part of the face pose candidate set, is estimated as the face pose. For instance, the methods of estimating the face pose may be switched according to the highest integrated likelihood value computed.

A face pose candidate set generator 16 generates the face pose candidate set, which is the set of the face pose candidates as hypotheses. More specifically, the face pose candidate set generator 16 preliminary generates an arbitrary face pose candidate set as an initial value. After the integrated likelihood is computed by the integrated likelihood estimator 143, a face pose candidate set to be used for the face pose estimation of the next image frame is generated, by using the face pose candidate set having a relatively large integrated likelihood, in order to continue the face pose estimation process for image frames to be sequentially inputted by capturing.

(First Embodiment: Face Pose Estimation in an Extent Where a Predetermined Face Organ can be Detected)

Next, the face pose detection process performed by the face pose estimation device 10 will be described with reference to FIG. 2 to FIG. 10. In this embodiment, a case of estimating the face pose of a driver driving a vehicle will be described, where the face pose estimation is performed within the extent that a predetermined face organ can be detected. It is based on a premise that images of the face of the driver are sequentially captured in a time series manner by a video camera installed in the vehicle and the captured face images are inputted as image frames into the face pose estimation device 10.

Figure 2:
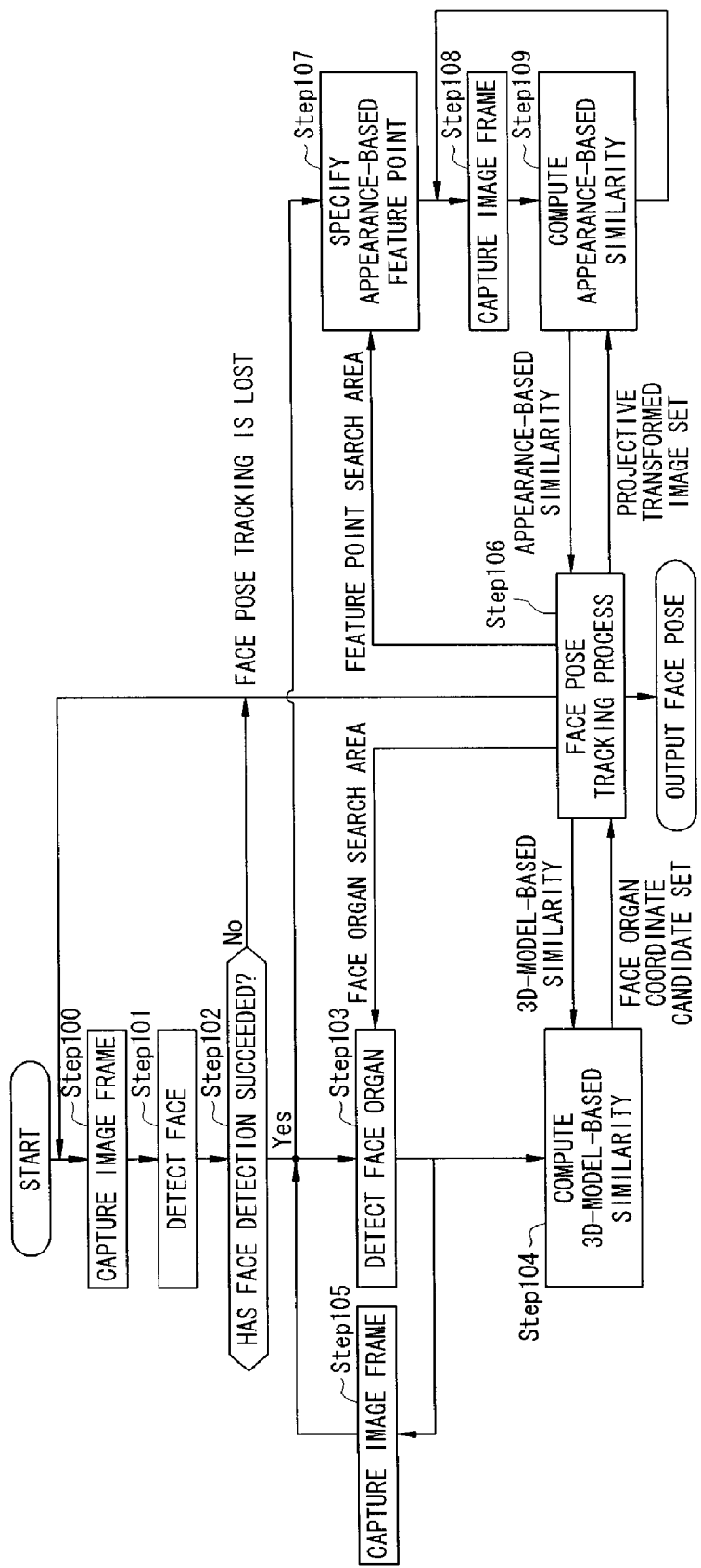
FIG. 2 is an overall flow chart of a face pose estimation process according to the embodiment.

In Step 100 in FIG. 2, the face pose estimation device 10 captures one frame of the image of the image frames sequentially inputted from the input interface.

In Step 101, the face organ detector 11 detects the entire face from the frame image. The face detection from the frame image can be performed by using an existing face detection technique such as the support vector machine.

In Step 102, it is determined whether the entire face detection has succeeded or not. If it is determined that it has succeeded, the processing proceeds to Steps 103 and 107. If it is determined that it has failed, the processing returns to Step 100, the next frame image is captured and the entire face detection process in Step 101 is repeated.

If it is determined that the entire face detection has succeeded in Step 102, both the 3D-model-based similarity computing process to be performed by the first similarity estimator 12 (Steps 103 to 105) and the appearance-based similarity computing process to be performed by the second similarity estimator 13 (Steps 107 to 109) are concurrently performed.

First, the processing flow of the 3D-model-based similarity computing process performed by the first similarity estimator 12 will be described. In Step 103, each of predetermined face organ search areas is specified by using the result of the entire face detection in Step 101, and the face organ is detected. For instance, the face organ detection in the face organ search area can be performed by using an existing face detection technique such as the support vector machine.

After completion of the face organ detecting process in Step 103, the next one frame image is captured in Step 105, and the face organ detecting process in Step 103 is repeated.

When the processes in Steps 105 and 103 are looped, in Step 103 the face organ is detected in the face organ search area specified in Step 106. The process in Step 106 will be described later.

In Step 104, the error between the position of the detected face organ in the image frame and the position of the face organ coordinate candidate generated in Step 106 is computed as the 3D-model-based similarity for every face organ detection in Step 103.

Figure 5:
FIG. 5 is a diagram showing an example of selected feature points according to the embodiment.

Next, the appearance-based similarity computing process to be performed by the second similarity estimator 13 will be described. In Step 107, the feature point of the face image is specified. The feature point of the face image is a point according to which the specific position of the image can readily be tracked when the image frame in the time series is provided. An example of a method of specifying the feature points is that, a feature point search area is determined on the face in the image frame by using the result of the entire face detection in Step 101 or by using the feature point search area specified in Step 106, an edge of a luminance image is extracted in the area, and pairs of points having a large error in luminance between the pair are selected from among pairs of points straddling the edge as the feature points. FIG. 3 shows an example of specifying the feature point search area on a screen. As in this example, a face organ area, a boundary area between the hair and face, a chin area or the like where variation in luminance is great on the screen, is selected as the feature point search area. As shown in FIG. 4, the edge of the luminance image in the feature point search area is extracted. As shown in FIG. 5, the pairs of points having a large error in luminance are selected from among the pairs of points straddling the edge, and the pairs of points are regarded as the feature points.

In Step 108, the next one frame image is captured.

In Step 109, the error in luminance values between the corresponding feature points in each of images in projectively transformed image set generated in Step 106 and the frame image captured in Step 108 is computed as the appearance-based similarity.

In Step 106, a face pose tracking process is performed.

Figure 6:
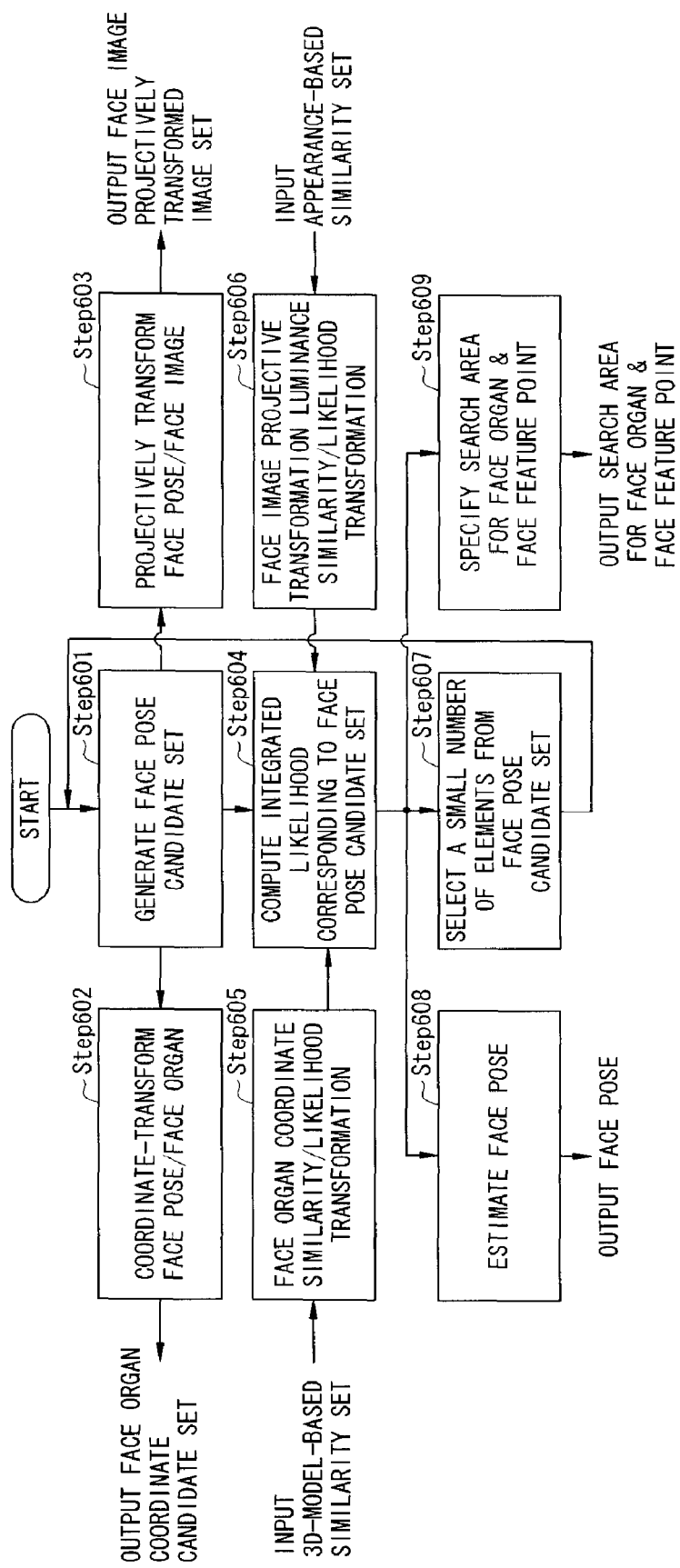
FIG. 6 is a flowchart showing a flow of a face pose tracking process according to the embodiment.

FIG. 6 is a diagram showing a flow of the face pose tracking process in Step 106. The details of the face pose tracking process in Step 106 will be described with reference mainly to FIG. 6.

First, a three-dimensional face shape model is preliminary prepared. The three-dimensional face shape model is face shape according to an application, for instance average face shape of adult Japanese males or average face shape of adult Japanese females. The model may be a model where the face shape of a specific individual as a target of the face pose estimation have been measured.

In Step 601, the face pose candidate set generator 16 generates a distribution of the face poses (probability density function) for each of six variables corresponding to the face pose to be estimated by a random number generator which generates independent random numbers, using the three-dimensional face shape model. That is, these total six variables include three dimensions of the yaw, pitch and roll with reference to the face orientation facing the camera, and three dimensions of the center position of the face shape model (x coordinate, y coordinate and z coordinate). In this embodiment, total 500 (=N) of the elements of the distribution of this face pose are generated; the set of the face pose candidates as the hypothesis representing each element of the distribution is defined as the face pose candidate set.

Figure 7:
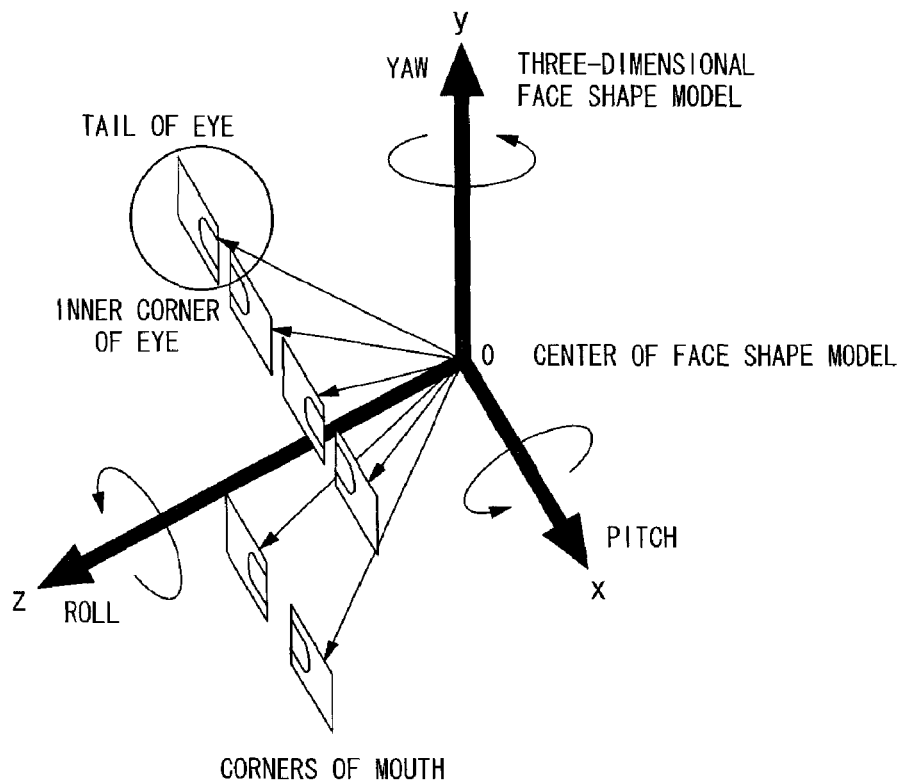
FIG. 7 shows an example of generating a face pose distribution by a three-dimensional face shape model according to the embodiment.

FIG. 7 shows an example of a three-dimensional face shape model on which the inner corners and tails of eyes, the corners of mouth and the like are arranged. In this three-dimensional face shape model, the distribution is generated for the face orientation of the yaw, pitch and roll and the center coordinates of the three-dimensional face shape model by a random number generator, and thereby generating 500 face poses. Each element of the face feature distribution includes three-dimensional coordinate of the inner corners and tails of eyes, the corners of mouth and the like.

In Step 602, the 500 three-dimensional face pose candidates generated in Step 601 are projected onto the image frame, and thereby two-dimensional coordinates of the face organ in the image frame corresponding to the face pose candidates are computed. The two-dimensional coordinates computed with respect to the 500 face pose candidates are defined as the face organ coordinate candidate set. This face organ coordinate candidate set is used for computing the error between the elements of the face organ coordinate candidate set and the actual face organ coordinates as the 3D-model-based similarities in Step 104 shown in FIG. 2.

Figure 8:
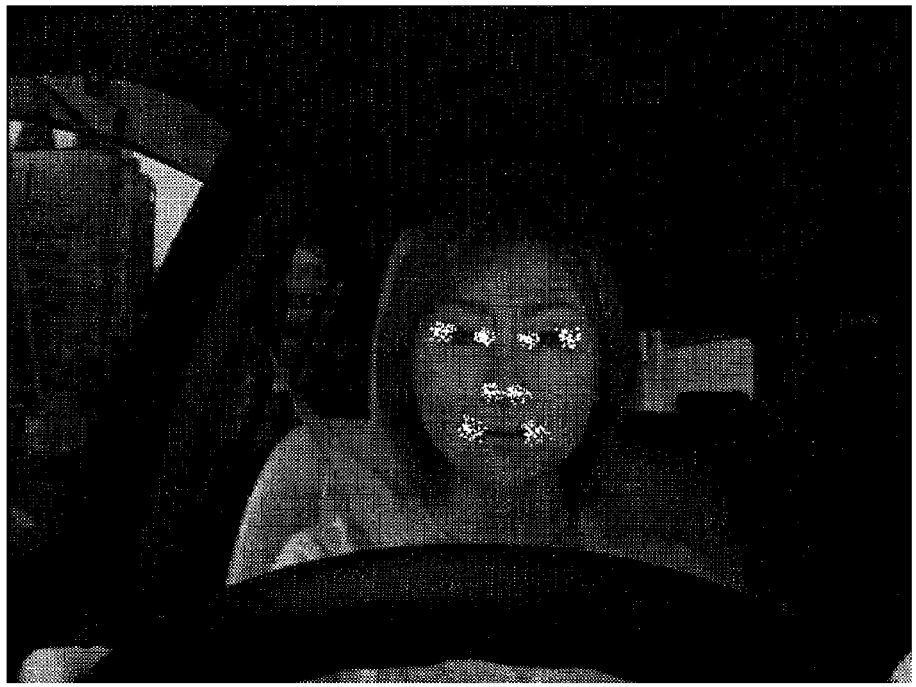
FIG. 8 shows an example of a distribution of two-dimensional coordinates of a face organ computed in Step 602 according to the embodiment.

FIG. 8 shows an example of a distribution of the two-dimensional coordinates of the face organ computed in Step 602. This example is a distribution where the distributions of the three-dimensional coordinates of the inner corners and tails of eyes, the corners of mouth and the nostrils on the three-dimensional face shape model generated in Step 601 has been transformed together by the projective transformation onto the two-dimensional coordinates on the image frame; the distribution is represented with white dots.

In Step 605, the first likelihood estimator 141 transforms each of the 500 3D-model-based similarities computed in Step 104 in FIG. 2 into the likelihood $P_p$ by using the following equation:

[Expression 1]

$$E_p = \frac{1}{500} \sum_{1}^{500} \{(x_d - x_m)^2 + (y_d - y_m)^2\} \quad (1)$$

$$P_p = e^{-\frac{E_p}{\sigma_m^2}}$$

where $(x_m, y_m)$ are coordinates of the face organs detected from the frame of the image that has been captured; $(x_d, y_d)$ are the face organ coordinate candidate set including the 500 face organ coordinate candidates; σ is the standard deviation of the face organ coordinate candidate set including the 500 face organ coordinate candidates; and e is the base of natural logarithms.

Figure 9:
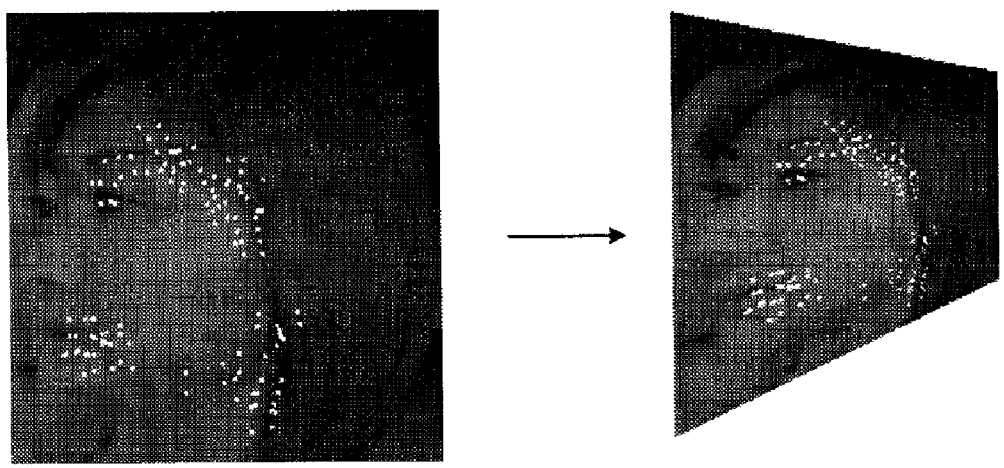
FIG. 9 shows an example of a projective transformation image according to the embodiment.

Step 603 refers to the face pose information of each of face pose candidates constituting the three-dimensional face pose candidate set generated in Step 601. Next, it computes the displacement of the face pose information against a predetermined reference position. As to the face image corresponding to the reference position, the image of the face organs to be detected is projectively transformed based on each of the computed 500 displacements, thereby generating a projectively transformed image set. Note that the reference position may be updated on processing each image frame. Instead, the reference position may be fixed. The projectively transformed image is used for computing the error in luminance value between the corresponding feature points of each element of the projectively transformed image set and the image frame as the appearance-based similarity in Step 109 in FIG. 2. FIG. 9 shows an example of the projectively transformed image.

In Step 606, the second likelihood estimator 142 transforms each of the 500 appearance-based similarities computed in Step 109 into the likelihood $P_i$ by using the following equation:

[Expression 2]

$$E_i = \frac{1}{500} \sum_{1}^{500} (I_d - I_m)^2 \quad (2)$$

$$P_i = e^{-\frac{E_i}{\sigma_2^2}}$$

where $I_d$ is a luminance of the face feature point detected from the frame of the image that has been captured; $I_m$ is a luminance of the feature point corresponding to each of the 500 projectively transformed images; σ represents the standard deviation of the projectively transformed image set including the 500 projectively transformed images; and e represents the base of natural logarithms.

In Step 604, the integrated likelihood estimator 143 multiplies the likelihoods computed in Steps 605 and 606, which correspond to the same face pose candidate, by each other, thereby computing the integrated likelihoods corresponding to the respective 500 face pose candidates generated in Step 601.

The 3D-model-based similarity (whose dimension is the distance) and the appearance-based similarity (whose dimension is the luminance) are thus transformed into the same dimension, namely the likelihood in Steps 605 and 606. Accordingly, the integrated likelihood can be computed by multiplication of the transformed likelihoods in Step 604. If tracking of the face pose is considered lost by a significantly low integrated likelihood computed, the processing returns to Step 100 and continue to process from the acquisition of the image frame.

In Step 607, the face pose candidate set are resampled using the integrated likelihoods computed in Step 604 as weight factors and a smaller number of the face pose candidate set are selected from among the 500 face pose candidates.

Subsequently, the processing returns to the generation of the face pose candidate set in Step 601. The face pose candidate set generator 16 duplicate the candidates according to the likelihoods as weight factors and add random numbers to the six variables of the each face pose to generate totally 500 face pose candidates again. The same processes are subsequently repeated in order to process the next image frame.

In Step 608, the face pose based on various numerical values included in the face pose information corresponding to the integrated likelihood whose value is the largest, from among the 500 face pose candidates, which have been computed in Step 604 and assigned with the integrated likelihoods, is outputted. Alternatively, the barycenter, the average value or the median value of the various numerical values, which are included in the face pose information corresponding to the face pose candidate set, is outputted as the estimated face pose.

In Step 609, the 500 face pose candidates (three-dimensional face organ coordinates) assigned with the integrated likelihoods computed in Step 604 are projected onto the image frame taking account of weighting by the integrated likelihoods, thereby generating a distribution area of the two-dimensional coordinates. Accordingly, the face organ search area to be used in Step 103 and the face feature point search areas to be used in Step 107 in FIG. 2 are specified.

(Face Pose Estimating Process)

Figure 10:
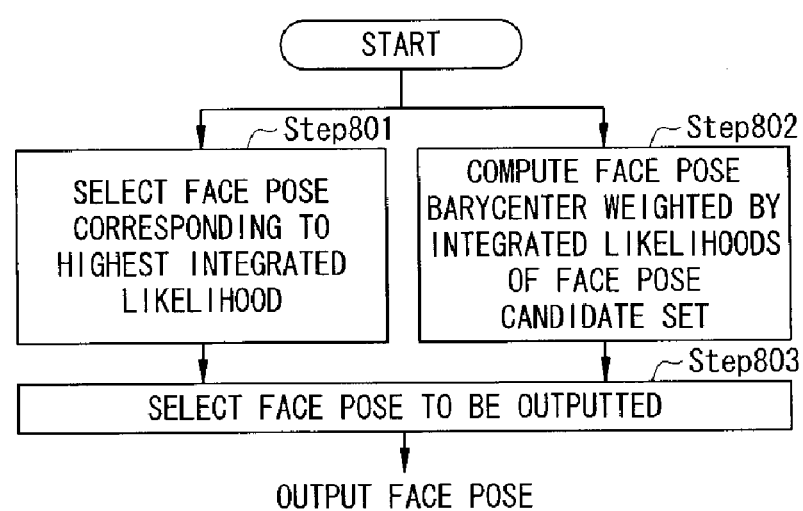
FIG. 10 is a flow chart showing a flow of a face pose estimation process according to the embodiment.

Next, a face pose estimating process performed by the face pose estimator 15 in Step 608 will be described with reference to the processing flow shown in FIG. 10.

The 500 face pose candidates and the integrated likelihoods corresponding to the respective face pose candidates are inputted from Step 604.

In Step 801, the face pose candidate corresponding to the likelihood having the highest value (hereinafter, referred to as the "highest integrated likelihood") is selected from among the 500 integrated likelihoods.

In Step 802, the weighted average of each of the total six parameters including three parameters of the face orientations and the three parameters of the face positions, which are the face pose information of the face pose candidates, is computed by using the weight of the integrated likelihoods corresponding to the 500 face pose candidates. In other words, the barycenter is computed. The face pose is thus computed. For instance, the weighting method includes multiplication of each parameter by the integrated likelihood. Note that the face pose is not limited to the barycenter. Instead, the average value or the median value may be adopted as the face pose.

In Step 803, either of the face pose estimation results in Steps 801 and 802 is selected; the selected estimation result is outputted as the face pose.

The face pose estimation result in Step 801 is highly effective in a case of accurately estimating the face pose in a situation with a satisfactory illumination condition and the like for the inputted face image and without partial occlusion of the image due to a hand over the camera and the like. On the other hand, in a situation with bad illumination condition or partial occlusion of the image, the estimated face poses may vary in a frame-by-frame basis, because an influence of for instance misdetection of the face organ is directly exerted thereon.

Since the face pose estimation result in Step 802 is derived from an computation result of the entire face pose candidate set in consideration of the integrated likelihoods, an influence of for instance misdetection of the face organ can be reduced, and a phenomenon of great change of the estimated face pose on a frame-by-frame basis can be suppressed, although a response to an abrupt change of the face pose is a little slower.

In the selection in Step 803, for instance, when the highest integrated likelihood selected in Step 801 exceeds a predetermined threshold and the face pose estimation corresponding to the highest integrated likelihood is dependable, the face pose estimation result in Step 801 is selected; when the highest integrated likelihood does not exceed the predetermined threshold, the face pose estimation result computed from the barycenter of the distribution of the face pose candidate set in Step 802 is selected. Providing of the barycenter of distribution of the face pose candidate set as one of alternatives of the face pose estimation results enables a robust system against a false positive in detection of the face organ to be constructed.

(Summary of First Embodiment)

Figure 11:
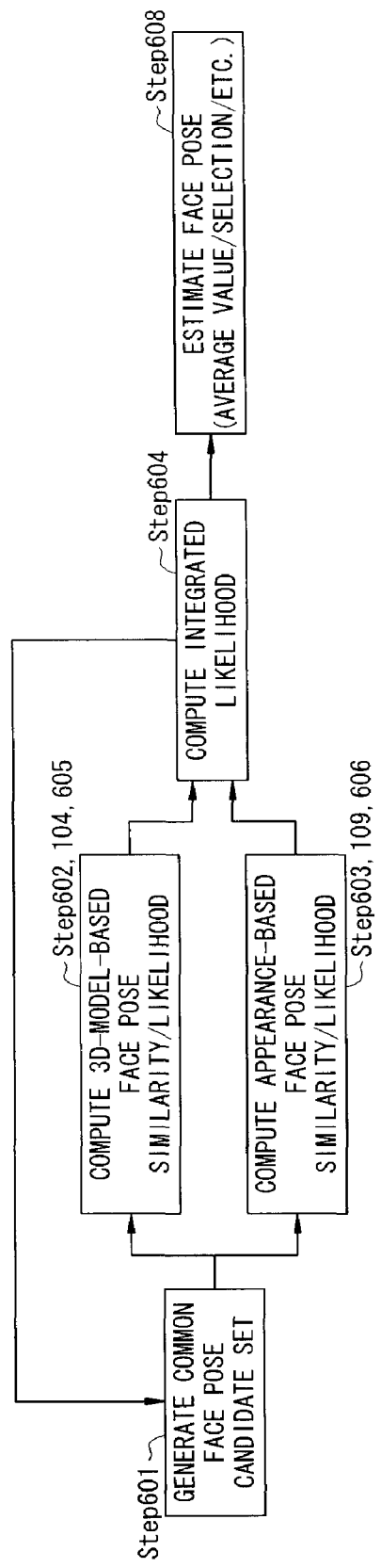
FIG. 11 is a diagram showing an overview of the flow of the face pose estimation process according to the embodiment.

FIG. 11 shows an overview of the flow of the face pose estimation process according to the first embodiment.

In Step 601, the common face pose candidate set used for both the 3D model basis and the appearance basis is generated.

In Steps 602, 104 and 605, the 3D-model-based similarity and likelihood are computed with respect to the common face pose candidate. In Steps 603, 109 and 606, the appearance-based similarity and likelihood are computed with respect to the common face pose candidate.

In Step 604, the 3D-model-based and appearance-based likelihoods are integrated, and the integrated likelihood is computed with respect to the common face pose candidate.

In Step 608, the face pose corresponding to the highest integrated likelihood, the median value or average value of the face pose candidate set having high likelihoods is outputted as the estimation result.

In Step 601, for instance, top 50 face pose candidates having higher integrated likelihoods are selected from among the 500 face pose candidates computed in Step 604; 500 face pose candidates are again newly generated on the basis of the selected 50 face pose candidates.

Since the 3D-model-based and appearance-based integrated likelihoods are thus computed in Step 604, the accuracy in estimation of the face pose is improved. Further, the common face pose candidate set used for both the 3D model basis and the appearance basis in Step 601 can be generated by using this estimation result, thereby enabling commonality of the face pose candidate set to be achieved for the first time. Conventionally, since the face pose is estimated by using each of the 3D-model-based and appearance-based methods on each element of the face pose candidate set, the accuracy in face pose estimation has been insufficient. The face pose estimation by using the two methods, whose performance characteristics (which will be described later) have the complementary relationship, enables the face pose to be highly accurately estimated.

(Second Embodiment: Face Pose Estimation Including an Extent Where a Predetermined Face Organ is Occluded)

Next an embodiment of the face pose estimation including an extent where the predetermined face organ is occluded will be described.

For instance, in a case where a camera for capturing face images of a driver is provided in front of the driver, such as on a meter hood, when the lateral face orientation of the driver (yaw angle) laterally faces aside 60 degrees or more, with reference to the front orientation specified as 0 degrees, the inner corners and tails of eyes, the nostrils and the corners of mouth, which are typically used in the three-dimensional face shape model based face pose estimation, are occluded from the captured image. Accordingly, the 3D-model-based face pose estimation cannot be performed. In this embodiment, the face pose estimation, in a case where the lateral face orientation of the driver (yaw orientation) turns aside from the front orientation and exceeding 60 degrees or more, is described.

When the face orientation of the driver is within an extent from the front orientation to 60 degrees aside, the predetermined face organ can be detected from the face image in the frame of the image taken by the camera. Accordingly, as described in the first embodiment, the loop of Steps 103, 104, 105 and 106 and the loop of Steps 107, 108, 109 and 106 in the overall processing flow shown in FIG. 2 are concurrently performed.

In Step 106, the integrated likelihood is computed by using both the 3D-model-based similarity computed in Step 104 and the appearance-based similarity computed in Step 109. For instance, a face pose tracking process is performed by means of a particle filter or the like. The face pose estimation value is outputted as the result of the face pose tracking process.

Subsequently, a case where the face turns aside and exceeds 60 degrees will be described.

When the lateral face orientation exceeds about 60 degrees, the face organ in a half of the face in the face image in the frame of the image captured by the camera begins to be occluded. Accordingly, the predetermined face organ cannot be detected.

In such a situation, the processes in Steps 103 and 104 cannot be performed. Accordingly, in Step 106, the face pose tracking process is performed by using only the appearance-based similarity computed in Step 109 as the likelihood for the face pose estimation. The face pose estimation value is outputted as the result thereof.

(Third Embodiment: Face Pose Estimation in a Case Where the Predetermined Face Organ is Always Occluded)

Next, an embodiment on face pose estimation in a case where the predetermined face organ is always occluded, such as a case of occlusion of the inner corners and tails of eyes of the driver due to wearing of sunglasses or occlusion of the corners of mouth due to wearing of a mask, will be described.

In this case, since the predetermined face organ is always occluded, the loop of Steps 103, 104, 105 and 106 is never performed, although the entire face detection of Steps 100, 101 and 102 and the loop of Steps 107, 108, 109 and 106 in the overall processing flow shown in FIG. 2 are performed.

In the loop of Steps 107, 108, 109 and 106, only a displacement of the face pose from the feature point specified in Step 106 is estimated. Accordingly, the reference position is necessary for computing the face pose as an absolute value. In typical cases, the reference position can be acquired when the 3D-model-based face pose estimating process is once performed by the loop of Steps 103, 104, 105 and 106.

In this embodiment, since the driver wears the sunglasses or the mask, the loop of Steps 103, 104, 105 and 106 is never performed, and thereby the reference position cannot be computed.

In order to solve this, since the most frequent face orientation of the driver on driving can be estimated to be the front orientation, a history of face pose displacements in a certain section in the past is computed in Step 106, and the most frequent face orientation is regarded as the front orientation (yaw angle) 0 degrees on the basis of a displacement histogram, thereby specifying the reference position. The face pose estimating process is performed by adding the face pose displacement to the frame of the image corresponding to the reference position.

(Estimation Data)

Figure 12:
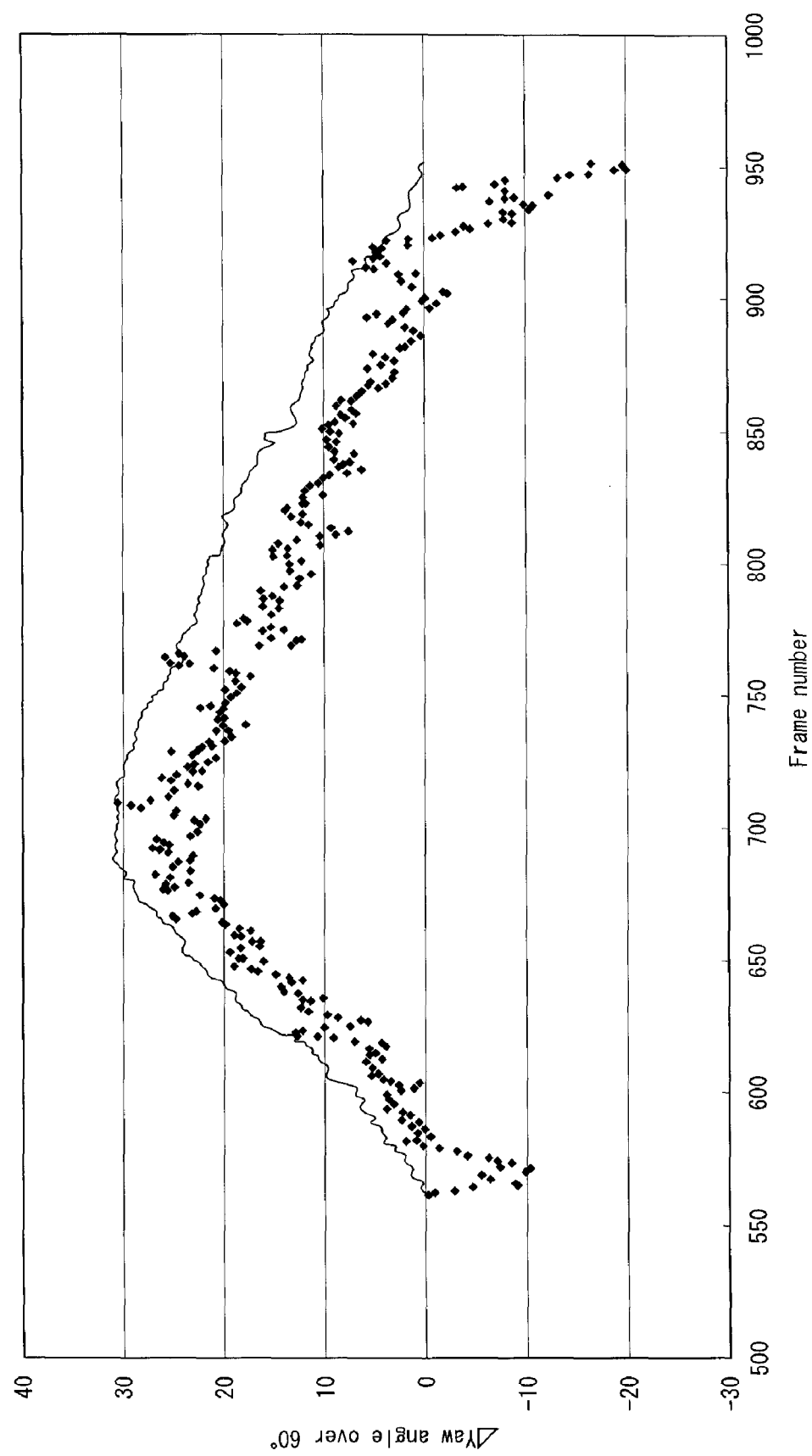
FIG. 12 is a graph showing a displacement yaw angle estimation result of the face pose according to a method of the present invention.

FIG. 12 shows a result of estimation of the face pose in a range laterally exceeding 60 degrees from the front orientation of the face by using the method according to the present invention. The axis of abscissas of the graph represents image frame numbers (time); the axis of ordinates represents an angle of displacement of the face in lateral orientation from a reference (0 degrees), which is specified as the orientation laterally aside (in yaw orientation) by 60 degrees from the front orientation of the face. The solid line represents an actual face pose. The distribution of points represents a face pose estimation result outputted from the face pose estimating device 10. It can be understood from this figure that the face pose can be estimated within an error of ten degrees or less, even in a range laterally exceeding 60 degrees from the front orientation of the face where the face organ cannot be detected.

Figure 13:
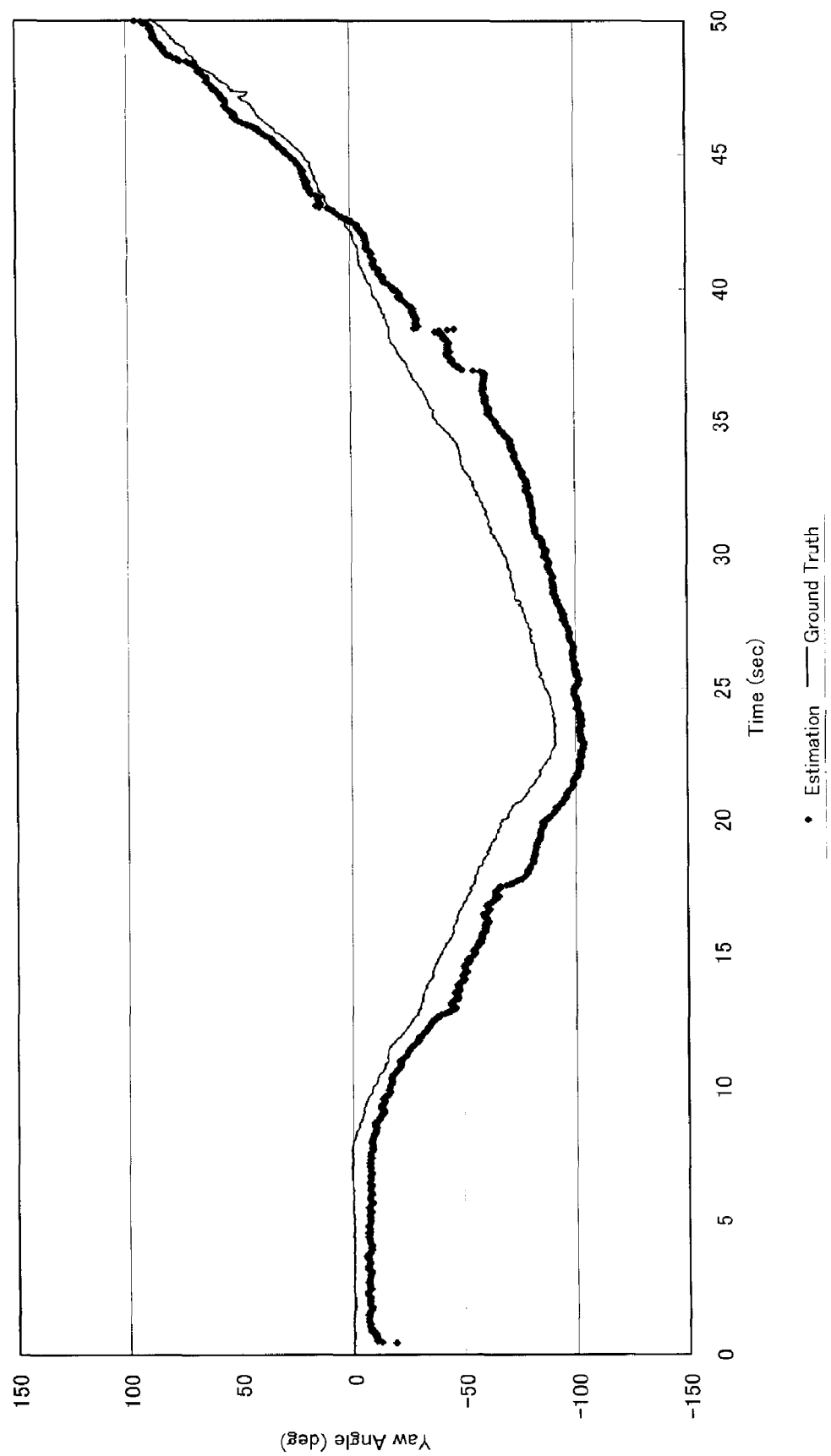
FIG. 13 is a graph showing a yaw angle estimation result of the face pose by using the method according to the present invention.

FIG. 13 shows a yaw angle estimation result of the face pose by using the method according to the present invention. Here, the estimation is made, provided that the coefficient value $\sigma_m$ of the 3D-model-based likelihood $P_p$ shown in the equation (1) is 16 ($\sigma_m^2 = 256$). The axis of ordinates of the graph represents the yaw angle of the face pose, where the front orientation of the face is regarded as 0 degrees, the plus orientation represents the rightward orientation and the minus orientation represents the leftward orientation. The axis of abscissas of the graph represents the elapsed time. The solid line represents the actual face pose. The distribution of points represents the face pose estimation result outputted from the face pose estimating device 10. In this case, the face pose starts with the front orientation of the face (0 degrees), subsequently begins to turn left after about ten seconds, turns to the left by about 90 degrees after about 23 seconds and then begins to return to the front orientation, reaches the front after about 42 seconds, continues to turn to the right and reaches the right by about 90 degrees after about 50 seconds. As shown in this figure, it is understood that the face pose can be estimated within an error of ten degrees or less laterally around the entire 90 degrees.

Figure 14:
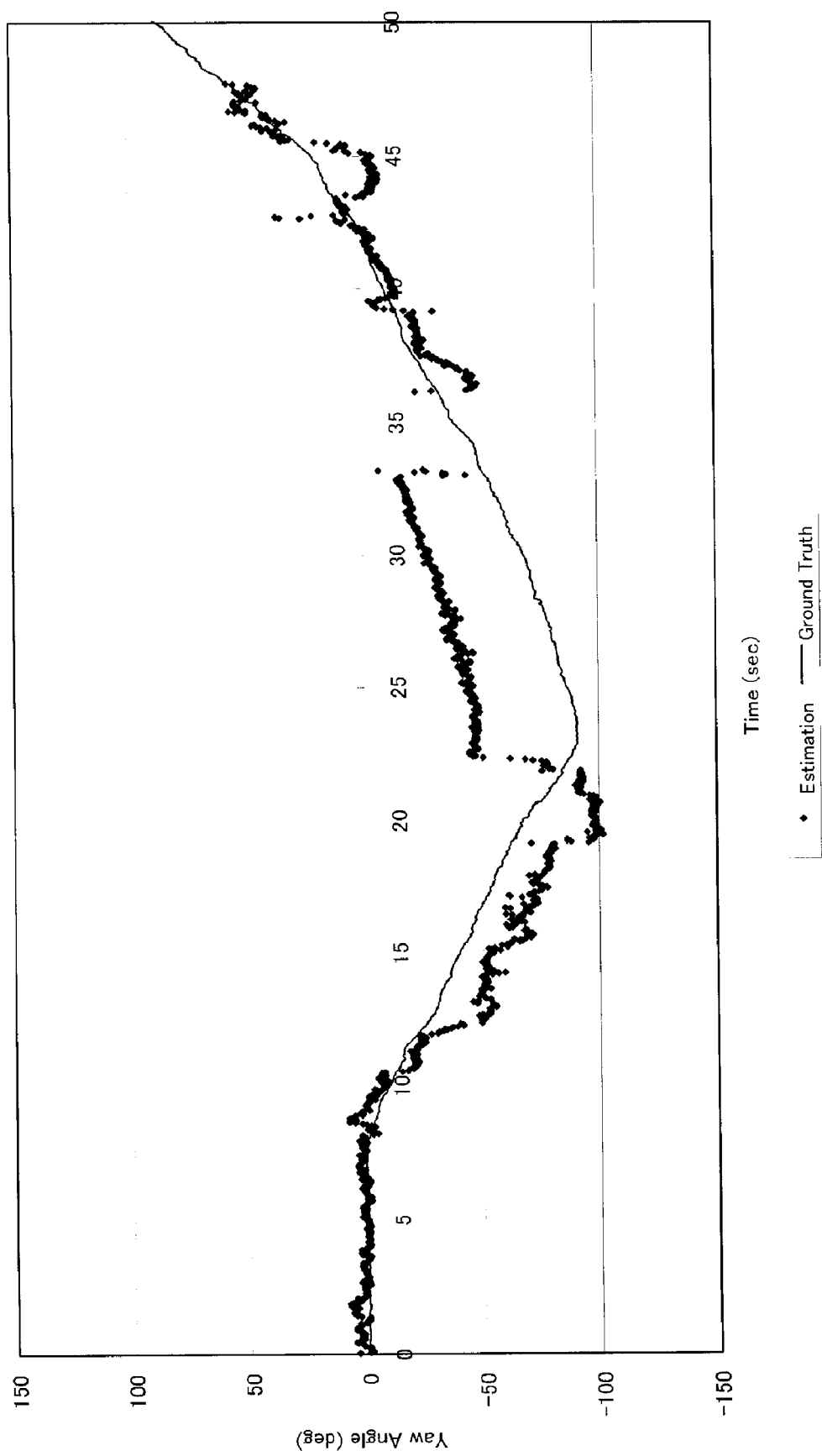
FIG. 14 is a graph showing a yaw angle estimation result of the face pose according to an aspect of the present invention in a case where 3D-model-based likelihood characteristics have been changed.

FIG. 14 shows a yaw angle estimation result of the face pose in a case where the 3D-model-based likelihood characteristics in FIG. 13 have been changed. In FIG. 14, the estimation is made, provided that the coefficient value $\sigma_m$ of the 3D-model-based likelihood $P_p$ shown in the equation (1) is 1 ($\sigma_m^2 = 1$). Note that the same appearance-based likelihood characteristics as those in FIG. 13 are used.

In FIG. 14, it is understood that use of the integrated likelihood exploiting the 3D model basis and the appearance basis on the common face pose candidate set as in FIG. 13 can achieve a significant improvement in performance of the face pose estimation. However, degradation in estimation accuracy is recognized in comparison with FIG. 13.

In the 3D model basis, the likelihood distribution characteristics for the face pose candidate set are determined by the coefficient value $\sigma_m^2$ of the 3D-model-based likelihood $P_p$ indicated in the equation (1). As a result, for instance, adoption of the likelihood taken into consideration of only elements with small errors in position by reducing the value $\sigma_m^2$ achieves sharpness with respect to the estimated face pose while emphasizing characteristics of weak tracking robustness. In contrast, adoption of the likelihood taken into consideration of more elements with large errors in position by increasing the value $\sigma_m^2$ allows less responsiveness with respect to estimated face pose while achieving characteristics tendency of strong tracking robustness. The characteristics of sensitivity in accuracy and the characteristics in the estimation robustness can thus be changed.

In the appearance basis, the likelihood distribution characteristics for the face pose candidate set are determined by the coefficient value $\sigma_a^2$ of the appearance-based likelihood $P_i$ indicated in the equation (2). As a result, for instance, adoption of the likelihood taken into consideration of only elements with small errors in position by reducing the value $\sigma_a^2$ achieves sharpness with respect to the estimated face pose while allowing characteristics of weak tracking robustness. In contrast, adoption of the likelihood taken into consideration of more elements with long positional distances by increasing the value $\sigma_m^2$ allows less responsiveness with respect to estimated face pose while emphasizing characteristic tendency of strong tracking robustness. The characteristics of sensitivity in accuracy and the characteristics in the estimation robustness can thus be changed.

Adjustment of each of the likelihood characteristics of the 3D-model-based face pose estimation and the likelihood characteristics of the appearance-based face pose estimation allows the most effective integrated likelihood to be acquired. The respective likelihood characteristics most suitable for the 3D model basis and appearance basis are acquired by trying combinations of some characteristics and finding the most suitable combination therefrom.

Note that, in the above description, only the influence according to a change in the 3D-model-based likelihood characteristics is shown by using FIG. 13 and FIG. 14. A change in appearance-based likelihood characteristics or a change in both the 3D-model-based and appearance-based likelihood characteristics may acquire the most effective integrated likelihood.

Figure 15:
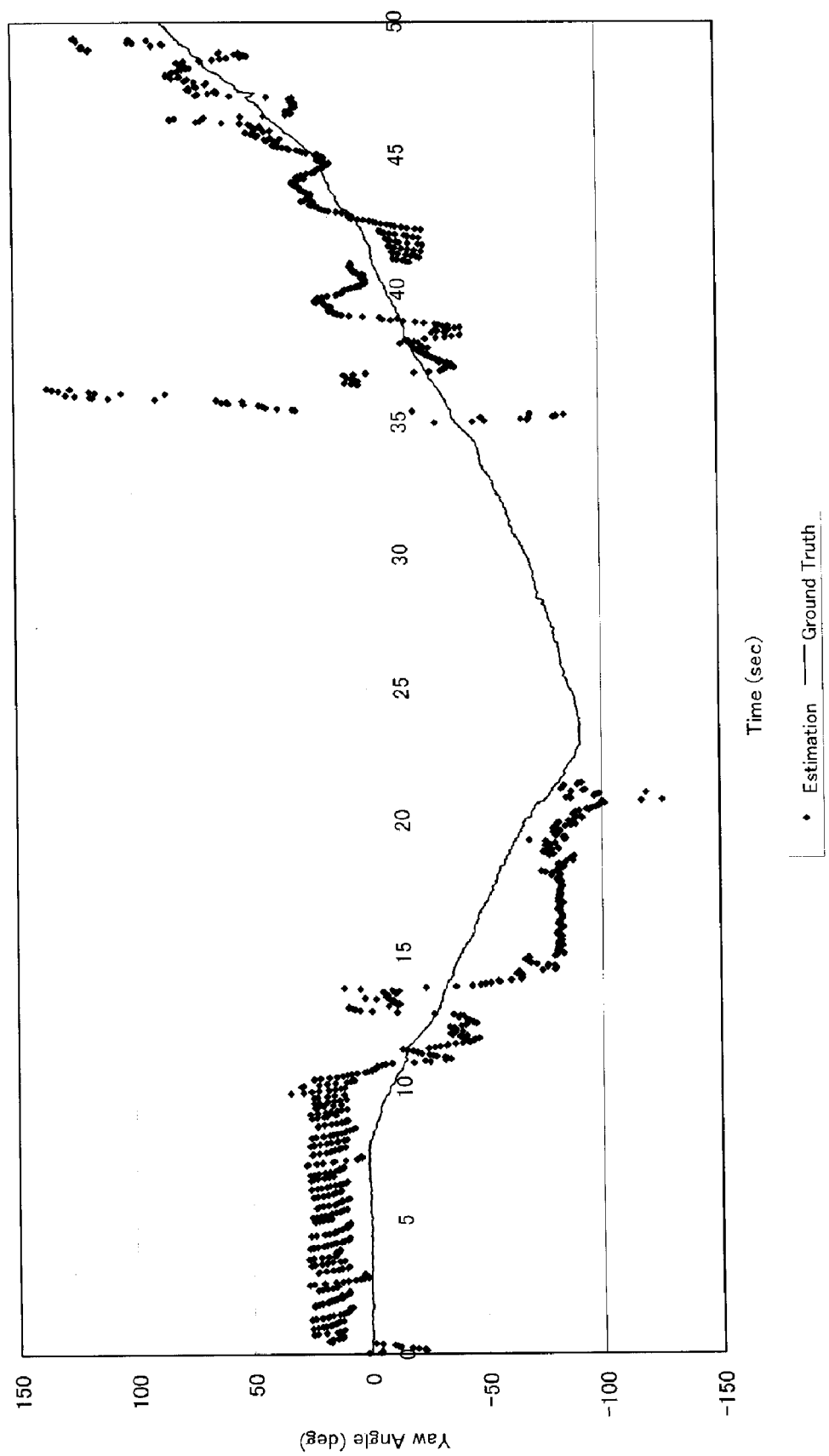
FIG. 15 is a graph showing a yaw angle estimation result of the face pose only by a 3D model based.

FIG. 15 shows a result where a yaw angle estimation of a face pose is performed only by the 3D model basis in comparison with the method of the present invention shown in FIG. 13. Here, the estimation is made, provided that the coefficient value $\sigma_m$ of the 3D-model-based likelihood $P_p$ indicated in the equation (1) is 16 ($\sigma_m^2 = 256$), as in FIG. 13. As shown in FIG. 15, it can be understood that the face pose estimation becomes impossible after about 21 seconds when the angle exceeds 60 degrees and most of the face organs are occluded from the screen. Even within 60 degrees, the estimation accuracy is bad only with the 3D model basis. Accordingly, the effect of using the appearance-based integrated likelihood together according to the present invention can be recognized.

Figure 16:
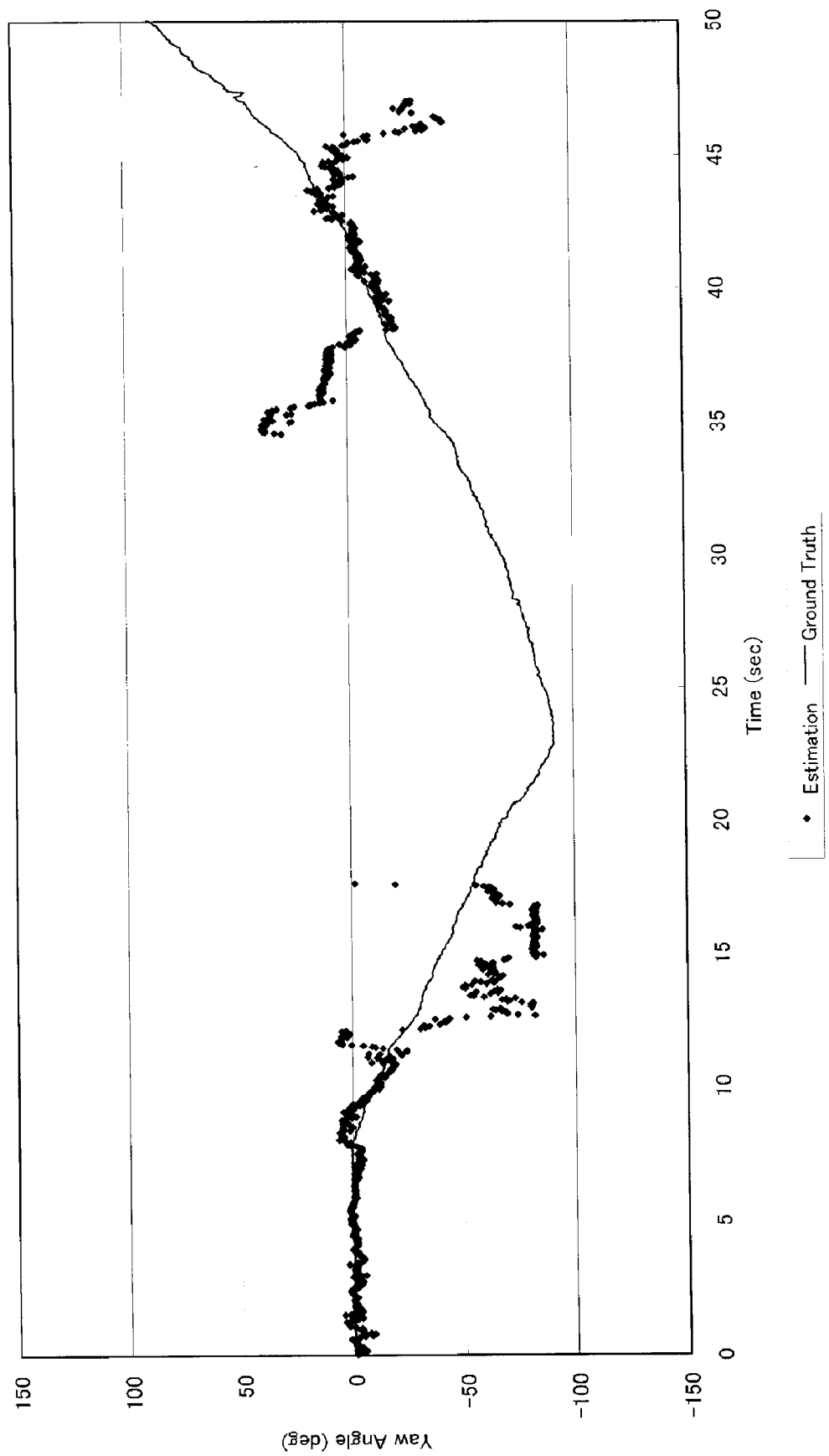
FIG. 16 is a graph showing a result where the 3D-model-based likelihood characteristics have been changed from those in FIG. 15 and a yaw angle of the face pose have been estimated only by the 3D model based.

FIG. 16 shows results of a yaw angle estimation of the face pose that has been performed only by 3D model basis in comparison with the method of the present invention shown in FIG. 14. In FIG. 16, the estimation is made, provided that the coefficient value $\sigma_m$ of the 3D-model-based likelihood $P_p$ indicated in the equation (1) is 1 ($\sigma_m^2=1$), as in FIG. 14. In FIG. 16, estimation results from the start to about ten seconds thereafter and from 38 seconds thereafter to about 45 seconds thereafter do not change greatly. It is recognized that the accuracy is improved, in comparison with the 3D-model-based yaw angle estimation result of the face pose where the coefficient value $\sigma_m$ is 16 shown in FIG. 15. In contrast, the tracking robustness is weakened, the estimation becomes impossible after about 18 seconds in FIG. 16, while the estimation can be made up to about 21 seconds in FIG. 15. That is, the change in the likelihood characteristics achieves sharpness with respect to the estimated face pose, while the weak characteristics in the tracking robustness are emphasized, in comparison with the estimation result shown in FIG. 15.

Figure 17:
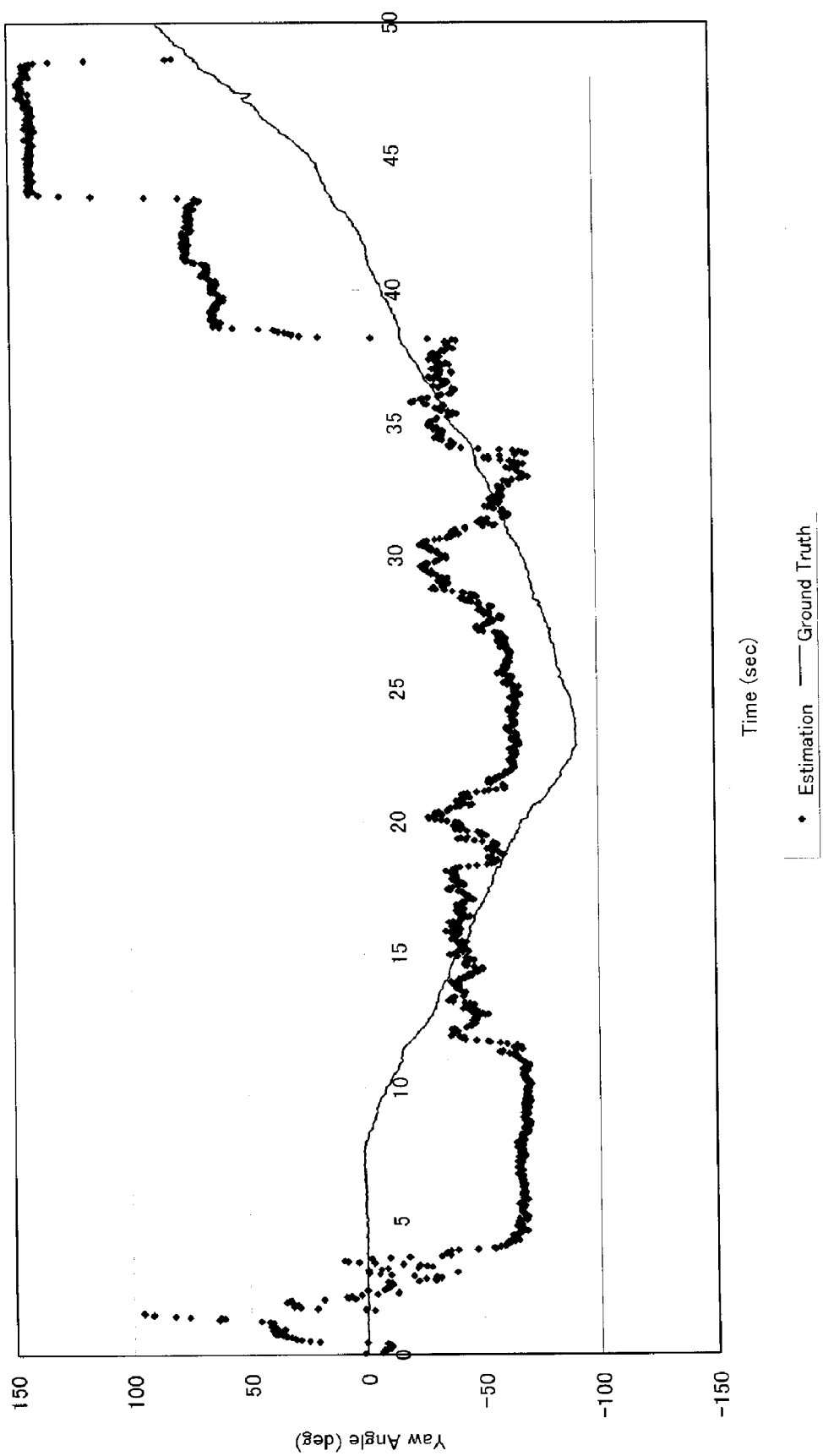
FIG. 17 is a graph showing a result in a case where a yaw angle of the face pose has been estimated only by the appearance based.

FIG. 17 shows an estimation result by estimating a yaw angle of the face pose only by the appearance basis in comparison with the method of the present invention shown in FIG. 13 and FIG. 14. In FIG. 17 the same appearance-based likelihood characteristics as those in FIG. 13 and FIG. 14 are used. Since the appearance-based face pose estimation does not use specific face organ coordinates, it can be understood that the face pose can be estimated even when the yaw angle exceeds approximately 60 degrees. However, since the appearance-based face pose estimation only uses the projective transformation information of the two-dimensional image pattern, the estimation accuracy is not high. Accordingly, the effect of using the 3D-model-based integrated likelihood together according to the present invention is recognized.

As recognized from the estimation result by the solely using methods shown in FIG. 15 to FIG. 17, the 3D-model-based face pose estimation is typically responsive to accuracy, while having characteristics of weak robustness to estimation. On the other hand, the appearance-based face pose estimation is less responsive to accuracy, while having characteristics of strong robustness to estimation.

In contrast to those, as shown in FIG. 13 and FIG. 14, the face pose estimation according to an aspect of the present invention exhibits high accuracy in comparison with a separate result of each of the 3D-model-based and appearance-based estimation.

The reason is as follows. That is, integration of the 3D model basis and the appearance basis with respect to the common face pose candidate set in the likelihood level allows favorable combination of the characteristics of the 3D-model-basis, which are responsive to estimation accuracy while weak in robustness, and the characteristics of the appearance basis, which are less responsive to estimation accuracy while strong in robustness. As a result, the characteristics responsive to estimation accuracy and strong in robustness can be realized.

In the face pose estimation from about 21 to 35 seconds, during which the face pose estimation only by the 3D model basis cannot achieve estimation, accurate estimation can be realized in comparison with the face pose estimation only by the appearance basis, by integrating the likelihood exploiting coordinates of some of the face organs that can be detected on the screen and the appearance-based likelihood and by use of the common face pose candidate set, even if the number of face organs is insufficient for the face pose estimation.

The above example has successfully illustrated that, typically, the 3D-model-based face pose estimation is responsive to accuracy while having characteristics of weak robustness to estimation and, on the other hand, the appearance-based face pose estimation is less responsive to accuracy while having characteristics of strong robustness to estimation. Integration of both with respect to the common face pose candidate set on the likelihood basis enables each of fine characteristics thereof to be combined. As a result, sensitivity in estimation accuracy and characteristics of strong robustness can be realized.

As described above, the face pose estimating device 10 computes the integrated likelihood by using the likelihood corresponding to the 3D-model-based similarity and the likelihood corresponding to the appearance-based similarity, and estimates the face pose by using the integrated likelihood computed. Accordingly, the device can perform more accurate face pose estimation than the face pose estimation by separately using of the likelihood corresponding to the 3D-model-based similarity and the likelihood corresponding to the appearance-based similarity. Conventionally, since the face pose is estimated by using each method on each of the face pose candidate sets, accuracy in the face pose estimation has been insufficient. However, use of the two methods having the complementary relationship of performance characteristics enables the face pose to be highly accurately estimated. More specifically, the 3D model basis can accurately estimate the face pose in a condition where a predetermined face organ can be accurately detected, while abruptly degrading performance in the face pose estimation in a case with a large error of detecting the predetermined face organ and incapable of supporting a range of the face orientation where the predetermined face organ cannot be detected. On the other hand, the appearance basis only deals with two-dimensional face images as targets. Accordingly, the appearance basis is of inferior face pose estimation accuracy in comparison with the 3D model basis. However, since the appearance basis does not use predetermined face organ detection coordinates, the influence of the error of detecting the face organ is not directly exerted thereon. Further, a complementary relationship, which is free from the range of the face orientation, is established.

In the above embodiment, the appearance basis and the 3D model basis have been described as the methods in the complementary relationship. Needless to say, methods that have another designation and establish a similar complementary relationship to those methods can be applied to the present invention.

Further, when one of the likelihoods has not been computed, the integrated likelihood is computed by using only the other computed likelihood. Accordingly, even when the face organ cannot be detected, the face pose can be estimated. The face pose can be estimated in a range of occlusion of eyes, nose and mouth, without restraining the user such as a driver and making the user wear gear. Moreover, even when wearing of glasses or change of hairstyle occludes the predetermined face organ, the face pose can be estimated.

INDUSTRIAL APPLICABILITY

The present invention enables the face pose to be detected even when a face organ cannot be detected from an image, and can also be applied to safe driving support for a driver of a vehicle.

The invention claimed is:
1. A face pose estimation device estimating a face pose representing at least an orientation of a face from a face image in which the face is captured in a time series manner, the device comprising:
 a face organ detector that detects a face organ from the face image;

a face pose candidate set generator that generates a face pose candidate set, which is a set of face pose candidates to be estimated;

a first similarity estimator that computes a first similarity according to a first parameter corresponding to respective positions of each face organ of each element of the face pose candidate set generated by the face pose candidate set generator and an actual face organ detected by the face organ detector;

a second similarity estimator that computes a second similarity according to a second parameter corresponding to a pixel value according to displacements of each face image of the face pose candidate set generated by the face pose candidate set generator and an actual face image detected as a detection target by the face organ detector with respect to each predetermined reference pose;

a first likelihood estimator that computes a first likelihood corresponding to the first similarity computed by the first similarity estimator;

a second likelihood estimator that computes a second likelihood corresponding to the second similarity computed by the second similarity estimator;

an integrated likelihood estimator that computes an integrated likelihood representing a degree of appropriateness of each element of the face pose candidate set by using the first and second likelihoods; and a face pose estimator that estimates the face pose on the basis of the face pose candidate having the highest integrated likelihood computed by the integrated likelihood estimator, the integrated likelihood being considered by the face pose candidate set generator for generating a face pose candidate set in the next time step.

2. The face pose estimation device according to claim 1, wherein the integrated likelihood estimator computes the integrated likelihood by using only either the first likelihood or the second likelihood in the case that the other likelihood is not available.

3. The face pose estimation device according to claim 1, wherein the first and the second similarity estimators have a complementary relationship complementing respective performance characteristics of each other.

4. The face pose estimation device according to claim 1, wherein the integrated likelihood estimator multiplies the first and second likelihoods by each other.

5. The face pose estimation device according to claim 1, wherein the first similarity estimator adopts a three-dimensional face shape model based similarity, the first parameter is an error in position, the second similarity estimator adopts a projective transformation appearance based similarity, and the second parameter is an error in pixel value.

6. The face pose estimation device according to claim 1, wherein the face pose estimator estimates the face pose on the basis of any one of an average value, a median value and a barycenter, which is an average value weighted by the integrated likelihood, of numerical values based on at least a part of the face pose candidate set generated by the face pose candidate set generator, instead of estimating the face pose on the basis of the face pose candidate having the highest integrated likelihood estimated by the integrated likelihood estimator.

7. The face pose estimating device according to claim 1, wherein the face pose estimator estimates the face pose on the basis of the face pose candidate corresponding to the highest integrated likelihood in the case that the highest integrated likelihood computed by the integrated likelihood estimator exceeds a predetermined threshold, and, the face pose estimator estimates the face pose on the basis of any one of an average value, a median value and a barycenter, which is an average value weighted by the integrated likelihood, of numerical values based on at least a part of the face pose candidate set generated by the face pose candidate set generator in the case that the highest integrated likelihood is equal to or less than the predetermined threshold.

8. The face pose estimation device according to claim 1, wherein the face pose candidate set generator generates the face pose candidate set used for computing the first and second similarities in the next time step on the basis of the face pose candidate set corresponding to a relatively higher integrated likelihood computed by the integrated likelihood estimator.

9. The face pose estimation device according to claim 1, wherein the face image is an image in which a driver's face of a vehicle has been captured.

10. A vehicle comprising the face pose estimation device according to claim 1.

11. A face pose estimation method estimating a face pose representing at least an orientation of a face from a face image in which the face is captured in a time series manner, the method comprising:

a face organ detecting step for detecting a face organ from the face image;

a face pose candidate set generating step of generating a face pose candidate set, which is a set of face pose candidates to be estimated;

a first similarity computing step of computing a first similarity according to a first parameter corresponding to respective positions of each face organ of each element of the face pose candidate set generated in the face pose candidate set generating step and an actual face organ detected by the face organ detecting step;

a second similarity computing step of computing a second similarity according to a second parameter corresponding to a pixel value according to displacements of each face image of the face pose candidate set generated in the face pose candidate set generating step and an actual face image detected as a detection target in the face organ detecting step with respect to each predetermined reference pose;

a first likelihood computing step of computing a first likelihood corresponding to the first similarity computed in the first similarity computing step;

a second likelihood computing step of computing a second likelihood corresponding to the second similarity computed in the second similarity computing step;

an integrated likelihood computing step of computing an integrated likelihood representing a degree of appropriateness of each element of the face pose candidate set on the basis of the face pose candidate having the highest first and second likelihoods; and a face pose estimating step of estimating the face pose by using the integrated likelihood computed in the integrated likelihood computing step.

12. A non-transitory computer readable storage medium that stores a face pose estimation program, the program when executed causing a computer to perform:

a face organ detecting step for detecting face organ from a face image in which the face is captured in a time series manner;

a face pose candidate set generating step of generating a face pose candidate set, which is a set of face pose candidates to be estimated;

a first similarity computing step of computing a first similarity according to a first parameter corresponding to respective positions of each face organ of each element of the face pose candidate set generated in the face pose candidate set generating step and an actual face organ detected by the face organ detecting step;

a second similarity computing step of computing a second similarity according to a second parameter corresponding to a pixel value according to displacements of each face image of the face pose candidate set generated in the face pose candidate set generating step and an actual face image detected as a detection target in the face organ detecting step with respect to each predetermined reference pose;

a first likelihood computing step of computing a first likelihood corresponding to the first similarity computed in the first similarity computing step;

a second likelihood computing step of computing a second likelihood corresponding to the second similarity computed in the second similarity computing step;

an integrated likelihood computing step of computing an integrated likelihood representing a degree of appropriateness of each element of the face pose candidate set by using the first and second likelihoods; and a face pose estimating step of estimating the face pose on the basis of the face pose candidate having the highest integrated likelihood computed in the integrated likelihood computing step.

* * * * *